United States Patent
Byagowi et al.

(10) Patent No.: US 11,616,587 B1
(45) Date of Patent: Mar. 28, 2023

(54) REMOTE CLOCK SYNCHRONIZATION USING NETWORK COMMUNICATION AND SATELLITE SIGNALS

(71) Applicant: Meta Platforms, Inc., Menlo Park, CA (US)

(72) Inventors: Ahmad Byagowi, Milpitas, CA (US); Georgi Chalakov, Duvall, WA (US); Michel Ouellette, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 198 days.

(21) Appl. No.: 17/107,686

(22) Filed: Nov. 30, 2020

(51) Int. Cl.
*H04B 7/19* (2006.01)
*H04J 3/06* (2006.01)
*G01S 19/05* (2010.01)

(52) U.S. Cl.
CPC ............ *H04J 3/0644* (2013.01); *G01S 19/05* (2013.01); *H04J 3/0661* (2013.01)

(58) Field of Classification Search
CPC ...... H04J 3/0644; H04J 3/0661; H04J 3/0697; H04J 1/065; G01S 19/05; H04W 88/16; H04W 4/00; H04W 72/046; H04W 72/048; H04B 7/0617; H04B 7/10; H04B 7/0469; H04L 5/1469; H04L 41/0803; H04L 45/02; H04L 5/14; H04H 20/67; H04M 2207/08; H04M 2207/18; H04M 2207/20
See application file for complete search history.

(56) References Cited

U.S. PATENT DOCUMENTS

| | | | | |
|---|---|---|---|---|
| 5,282,224 A | * | 1/1994 | Harada | H03C 3/00 455/226.1 |
| 5,914,981 A | * | 6/1999 | Veintimilla | H04L 27/2613 375/E1.001 |
| 5,943,375 A | * | 8/1999 | Veintimilla | H04W 56/0085 375/364 |
| 6,236,623 B1 | * | 5/2001 | Read | G04R 20/02 368/46 |
| 6,324,586 B1 | * | 11/2001 | Johnson | G04G 7/02 342/356 |
| 6,816,510 B1 | * | 11/2004 | Banerjee | H04Q 11/0478 370/510 |
| 6,828,935 B1 | * | 12/2004 | Dunn | H01Q 3/26 342/383 |
| 7,215,652 B1 | * | 5/2007 | Foley | H04B 7/212 370/324 |

(Continued)

*Primary Examiner* — Stephen M D Agosta
(74) *Attorney, Agent, or Firm* — Van Pelt, Yi & James LLP (57) ABSTRACT

A reference time associated with a satellite signal received at a clock synchronization source is determined, wherein the reference time is from a master reference clock. A recorded time associated with a corresponding satellite signal received at a remote clock synchronization destination is received from the remote clock synchronization destination via a network, wherein the received recorded time is from a remote clock to be synchronized with the master reference clock. A clock adjustment value is calculated based on a comparison of the determined reference time and the received recorded time. The clock adjustment value is provided to the remote clock synchronization destination, wherein the clock adjustment value is able to be utilized by the remote clock synchronization destination to adjust the remote clock to increase synchronization with the master reference clock.

20 Claims, 7 Drawing Sheets

(56) References Cited

U.S. PATENT DOCUMENTS

| | | | | |
|---|---|---|---|---|
| 7,359,344 B1* | 4/2008 | Cheng | H04B 7/18589 | 370/321 |
| 7,394,780 B1* | 7/2008 | Gregory | H04L 1/0009 | 370/316 |
| 8,068,448 B1* | 11/2011 | Foley | H04B 7/18515 | 455/12.1 |
| 9,106,353 B2* | 8/2015 | Hsueh | H04L 63/0428 | |
| 10,411,362 B2* | 9/2019 | Hreha | H04W 56/0015 | |
| 11,368,972 B2* | 6/2022 | Hampel | H04L 47/30 | |
| 2003/0083103 A1* | 5/2003 | Drawert | H04W 56/006 | 455/561 |
| 2005/0286349 A1* | 12/2005 | Cook | G04R 20/26 | 368/47 |
| 2006/0281476 A1* | 12/2006 | Lane | H04B 7/2125 | 455/70 |
| 2007/0194987 A1* | 8/2007 | Fedora | G01S 5/14 | 342/386 |
| 2008/0039125 A1* | 2/2008 | Fan | H04L 12/1827 | 455/500 |
| 2008/0287153 A1* | 11/2008 | Fullam | H04N 21/4302 | 455/502 |
| 2011/0075685 A1* | 3/2011 | Xu | H04L 27/2672 | 370/503 |
| 2013/0322426 A1* | 12/2013 | Niranjayan | H04W 56/0055 | 370/350 |
| 2013/0329630 A1* | 12/2013 | Becker | H04B 7/18513 | 370/326 |
| 2014/0269672 A1* | 9/2014 | Zampetti | H04W 56/0015 | 370/350 |
| 2014/0354446 A1* | 12/2014 | Nakayama | E21B 47/12 | 340/854.9 |
| 2015/0003479 A1* | 1/2015 | Shenoi | H04J 3/0661 | 370/503 |
| 2015/0078250 A1* | 3/2015 | Mineta | H04J 13/12 | 370/320 |
| 2015/0215031 A1* | 7/2015 | Dalvi | H04B 7/18578 | 370/324 |
| 2015/0319725 A1* | 11/2015 | Marshall | G01S 19/42 | 342/450 |
| 2015/0341881 A1* | 11/2015 | Hiltunen | H04W 56/005 | 370/350 |
| 2016/0330707 A1* | 11/2016 | Das | H04L 67/535 | |
| 2019/0116567 A1* | 4/2019 | Zhang | H04L 27/2607 | |
| 2019/0116569 A1* | 4/2019 | Zhao | H04W 56/0015 | |
| 2021/0075501 A1* | 3/2021 | Xu | H04B 7/18523 | |
| 2022/0050213 A1* | 2/2022 | De Wilde | G01S 19/215 | |
| 2022/0159601 A1* | 5/2022 | Mayer | H04W 56/0035 | |

* cited by examiner

REMOTE CLOCK SYNCHRONIZATION USING NETWORK COMMUNICATION AND SATELLITE SIGNALS

BACKGROUND OF THE INVENTION

Global Navigation Satellite Systems (GNSSs) are satellite-based radionavigation systems that provide geolocation and time information to receivers located on or near the Earth. The Global Positioning System (GPS) is a widely known example of a GNSS. Other examples include GLONASS, BeiDou, and Galileo. A GNSS includes three primary components: satellites that broadcast satellite position and time information, ground stations that monitor and manage the operational health of the satellites, and receivers (on or near the Earth) that listen for satellite broadcasted information to utilize to calculate receiver position and time. GNSS satellites carry stable atomic clocks that are synchronized with one another and with ground clocks. Each satellite transmits a radio signal including time and three-dimensional position information. A receiver that receives information from multiple satellites can utilize the information to solve equations governing receiver position and time. Typically, the receiver utilizes information from at least four satellites, corresponding to solving for four dimensions— three spatial dimensions as well as time. Solving for time (e.g., a current time common to all the GNSS satellites) for receivers in different locations results in time synchronization of the different receivers. In some scenarios, GNSS time synchronization of different receivers can be problematic. Thus, it would be beneficial to develop techniques directed toward improving synchronization of devices that utilize GNSS time information.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Network remote clock synchronization is disclosed. A reference time associated with a satellite signal received at a clock synchronization source is determined, wherein the reference time is from a master reference clock. A recorded time associated with a corresponding satellite signal received at a remote clock synchronization destination is received from the remote clock synchronization destination via a network, wherein the received recorded time is from a remote clock to be synchronized with the master reference clock. A clock adjustment value is calculated based on a comparison of the determined reference time and the received recorded time. The clock adjustment value is provided to the remote clock synchronization destination, wherein the clock adjustment value is able to be utilized by the remote clock synchronization destination to adjust the remote clock to increase synchronization with the master reference clock. A practical and technological benefit of the techniques disclosed herein is improved time synchronization (also referred to herein simply as synchronization) of devices in a network (e.g., a network in which devices are separated by a large physical distance). Reliability of GNSS (e.g., GPS) time synchronization is improved. Prior approaches are deficient because they fail to account for potential interference to GNSS signals that can disrupt GNSS time synchronization. The techniques disclosed herein address deficiencies in prior approaches by communicating a clock adjustment value using the network whose devices are to be time synchronized.

In various embodiments, a requester's hardware timestamp is sent to a node (selected as the true time source) via a network and the node provides a difference between its timestamp value and the requester's timestamp value as a response. In this manner, all nodes can find their difference with a true time source node. In some embodiments, this difference (also referred to as an error) is reduced through a servo mechanism to minimize spontaneous and short-term errors. In various embodiments, the true time source node is equipped with a higher stability oscillator such as an oven-controlled crystal oscillator (OCXO) or an atomic clock (e.g., a cesium or rubidium atomic clock).

Figure 1:
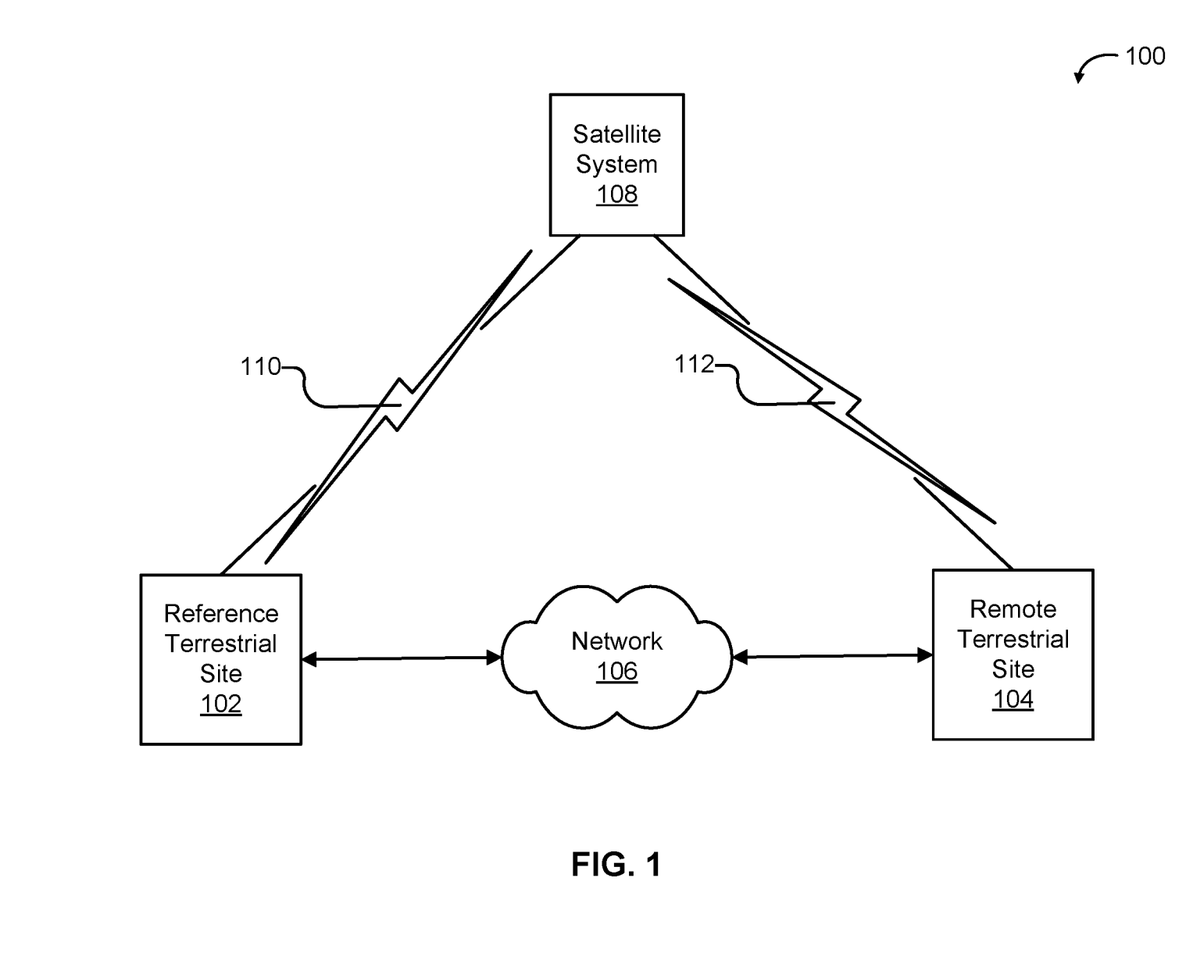
FIG. 1 is a block diagram illustrating an embodiment of a system for synchronizing a remote terrestrial site.

FIG. 1 is a block diagram illustrating an embodiment of a system for synchronizing a remote terrestrial site. As used herein, remote/destination refers to a node in a network to be synchronized with a node that is a true time source. As used herein, reference/source refers to the true time source node. In system 100, reference terrestrial site 102 and remote terrestrial site 104 are sites on the Earth that are communicatively connected to each other through network 106. In various embodiments, reference terrestrial site 102 includes a clock device that serves as a master reference clock to which a clock device of remote terrestrial site 104 (a remote clock) is to be synchronized. In various embodiments, the clock device of reference terrestrial site 102 is a part of a larger machine, component, system, etc. (e.g., see FIG. 2). In various embodiments, the clock device of remote terrestrial site 102 is a part of a larger machine, component, system, etc. (e.g., see FIG. 3). In some embodiments, reference terrestrial site 102 and remote terrestrial site 104 are two data centers (or other computing facilities) for which time synchronization between them is desirable. Reference terrestrial site 102 and remote terrestrial site 104 can each include one or more local networks separate from network 106. In some embodiments, reference terrestrial site 102 includes a master reference clock that synchronizes other clocks at reference terrestrial site 102. In some embodiments, remote terrestrial site 104 includes a remote clock that, once synchronized to the master reference clock of reference terrestrial site 102, can be utilized to synchronize other clocks at remote terrestrial site 104.

In various embodiments, reference terrestrial site 102 and remote terrestrial site 104 are separated by a large physical distance. For example, the two sites may be separated by hundreds, thousands, or more miles. Reference terrestrial site 102 and remote terrestrial site 104 are communicatively connected through network 106. Examples of network 106 include one or more of the following: a direct or indirect physical communication connection, mobile communication network, Internet, Wide Area Network (WAN), and any other form of connecting two or more systems, components, or storage devices together. In some embodiments, a WAN connects reference terrestrial site 102 and remote terrestrial site 104. In various embodiments, network 106 is not utilized to directly synchronize terrestrial site 102 and remote terrestrial site 104 because network 106 is not configured to perform precise time synchronization. For example, in an embodiment in which network 106 is a WAN, network 106 would not be suitable for utilization of precision time protocol (PTP) because the WAN is not PTP-compliant. As used herein, PTP refers to a commonly used packet-based clock synchronization protocol that is published as the IEEE-1588 standard. Typically, large distances between synchronization sites (e.g., in a WAN) can result in asymmetric latencies that cause PTP implementation to be infeasible. Network time protocol (NTP) can be used to communicate time synchronization across large distances, but it possesses inherently low accuracy due to unpredictable delay of packets while in transit. For the above reasons, in various embodiments, during normal operation, reference terrestrial site 102 and remote terrestrial site 104 are time synchronized using GNSS (e.g., GPS) technology.

In the example shown, satellite system 108 transmits broadcast 110 to reference terrestrial site 102 and broadcast 112 to remote terrestrial site 104. In various embodiments, satellite system 108 is a GNSS, such as GPS. In various embodiments, satellite system 108 comprises a constellation of at least several dozen space satellites orbiting the Earth. The orbits of the satellites are configured so that multiple satellites (e.g., at least six in the case of GPS) are always within a line of sight of any location of the Earth. In various embodiments, broadcast 110 and broadcast 112 are each comprised of signals from multiple satellites of satellite system 108. For example, a broadcast of four signals from four satellites would be sufficient for a receiver (also referred to herein as a satellite receiver, GNSS receiver, GPS receiver, timing receiver, etc.) at either reference terrestrial site 102 or remote terrestrial site 104 to calculate (e.g., by solving a system of four equations with four unknowns) its geolocation and time, wherein the time corresponds to a synchronized time kept by all the satellites of satellite system 108. It is also possible for broadcast 110 and broadcast 112 to comprise the same signals being transmitted.

Under normal operating conditions, reference terrestrial site 102 and remote terrestrial site 104 can be time synchronized by receiving a common time from satellite system 108 via broadcasts 110 and 112. However, it is possible to encounter reliability problems. For example, remote terrestrial site 104 would not be able to be time synchronized to reference terrestrial site 102 if satellite receiver(s) at remote terrestrial site 104 are jammed (e.g., disrupted by deliberate use of radio transmissions to prevent listening to broadcasts from satellite system 108), spoofed (e.g., fed incorrect geolocation and/or time signals intended to be mistaken for actual signals from satellite system 108), or otherwise interfered with (e.g., from electronic noise emitted by other electronic devices operating legally in the same vicinity). Stated alternatively, in some scenarios, information from satellite system 108 may not be trustworthy. As used herein, an outage (also referred to herein as a GNSS outage, satellite outage, etc.) refers to any scenario (e.g., jamming, spoofing, interference, etc.) in which a site (e.g., remote terrestrial site 104) cannot rely on time information transmitted by a GNSS (e.g., satellite system 108).

In various embodiments, receivers of reference terrestrial site 102 and remote terrestrial site 104 are configured to generate pulse-per-second (PPS) signals that are associated with (e.g., aligned with) satellite system 108. The PPS signals are typically utilized to provide synchronization signals to other devices. For example, a PPS signal generated by a receiver of remote terrestrial site 104 can be utilized to synchronize other devices (clocks) at remote terrestrial site 104. In various embodiments, the PPS signal has a periodicity of one second. Other periodicity values are also possible. In various embodiments, a specified portion of each PPS signal (e.g., a first flat portion, an edge, etc.) aligns accurately with each second of time according to satellite system 108. In various embodiments, a receiver/device generating PPS signals has a protocol to determine whether any given PPS signal is accurate enough to output to other devices. For example, a receiver can reject a calculated/received time from satellite system 108 when it appears as if the time deviates from a specified tolerance compared with a prior calculated/received time and consequently not output a corresponding PPS signal. Deviations can be caused by jamming, spoofing, interference, etc.

In various embodiments, a satellite outage (e.g., due to jamming, spoofing, interference, etc.) at remote terrestrial site 104 is remedied through a correction delivered by reference terrestrial site 102. For example, the correction can be made as follows. Given that both sites have PPS signals that are aligned during normal operation, during a PPS signal cycle (e.g., one period), a timestamp associated with the PPS signal at remote terrestrial site 104 can be recorded. For example, the timestamp can be recorded by a physical hardware clock (PHC) at remote terrestrial site 104. During the satellite outage, PPS signals at remote terrestrial site 104 can still be generated even if there is a disconnection between remote terrestrial site 104 and satellite system 108.

A disconnection may cause PPS signals to drift and be inaccurate, but PPS signals could still be generated (e.g., in a holdover state). At the same time that PPS signals are generated at remote terrestrial site 104, corresponding PPS signals are also generated at reference terrestrial site 102. In the absence of a satellite outage at reference terrestrial site 102, a reference time from reference terrestrial site 102 can be used to synchronize a potentially faulty clock at remote terrestrial site 104. In some embodiments, PPS signals at reference terrestrial site 102 are aligned with a master reference clock (e.g., an atomic clock) at reference terrestrial time 102. Time kept by the master reference clock may also be synchronized with time kept by satellite system 108 (e.g., if the master reference clock is one of one or more ground-based clocks that feed and/or update satellite system 108 with time information). In various embodiments, a reference time is recorded at reference terrestrial site 102 (e.g., a reference timestamp). The reference timestamp parallels the timestamp recorded at remote terrestrial site 104, though there would likely be an offset if there is a satellite outage at remote terrestrial site 104. In various embodiments, reference terrestrial site 102 receives the timestamp corresponding to time kept by remote terrestrial site 104 via network 106, calculates a clock adjustment value corresponding to a difference between the timestamp recorded at remote terrestrial site 104 and the reference timestamp, and transmits the clock adjustment value back to remote terrestrial site 104 via network 106 so that the clock adjustment value is able to be utilized by remote terrestrial site 104 to adjust a clock at remote terrestrial site 104 to increase synchronization with the master reference clock at reference terrestrial site 102.

In the above manner, remote terrestrial site 104 can be time synchronized with reference terrestrial site 102 even if GNSS time at remote terrestrial site 104 is not reliable and network 106 is not PTP-compliant. Multiple devices in a local network at remote terrestrial site 104 can be synchronized using the transmitted clock adjustment value. In various embodiments, during normal operation, signals from satellite system 108 are utilized to determine time, but when an anomalous time reading occurs (e.g., due to jamming, spoofing, interference, etc.), the above synchronization technique utilizing communication over network 106 is employed. In some embodiments, reference terrestrial site 102 is utilized as a source of time synchronization for a plurality of remote terrestrial sites (e.g., if multiple remote terrestrial sites experience unreliable GNSS time). In some embodiments, a matrix of terrestrial site time differences (between sites) is maintained (e.g., at reference terrestrial site 102) with a goal of keeping the matrix zero or close to zero (corresponding to synchronization across all terrestrial sites). It is also possible to have multiple synchronization sources (e.g., multiple sites with atomic clocks). A benefit of such a structure is that one synchronization source site may be spoofed (or otherwise interfered with), but it would be difficult to do so for all synchronization source sites. This is a consensus/redundancy approach. Such an approach can be utilized to synchronize across multiple networks spanning large physical distances (e.g., multiple WANs). In some embodiments, network 106 is a land-based WAN (e.g., using fiber optic connections). It is also possible for network 106 to be a wireless WAN. For example, it is possible for network 106 to include satellites (e.g., the same satellites as in satellite system 108) to allow for communication with terrestrial sites that are moving objects (e.g., sites that are vehicles, such as cars, trains, airplanes, helicopters, etc.) that need to be time synchronized with other moving objects or stationary locations. A benefit of the techniques disclosed herein is allowing for secure communications. Synchronized time is useful for security in the sense that two sites, vehicles, machines, etc. being synchronized could be a requirement for secure communication between them.

In some scenarios, signals from satellite system 108 arrive at reference terrestrial site 102 and remote terrestrial site 104 at the same time or nearly the same time. In these scenarios, timestamps (recorded times) associated with reception of signals from satellite system 108 can be directly compared. A reference time (e.g., a first timestamp) associated with when a satellite signal was received at reference terrestrial site 102 is recorded. In various embodiments, the reference time is from a master reference clock, such as an atomic clock, OCXO, another clock, etc. Remote terrestrial site 104 also records a time (a second timestamp) associated with when the satellite signal was received at remote terrestrial site 104. This time may be inaccurate and offset from the reference time for a variety of reasons (e.g., jamming, spoofing, interference, etc.). The time recorded at remote terrestrial site 104 is associated with a clock at remote terrestrial site 104 that is to be synchronized with the master reference clock. The time recorded at remote terrestrial site 104 is transmitted to reference terrestrial site 102 (via network 106) where a clock adjustment value based on a comparison of the time recorded at remote terrestrial site 104 and the reference time is calculated and provided back to remote terrestrial site 104 (via network 106) to be utilized to synchronize the clock at remote terrestrial site 104 with the master reference clock.

Figure 2:
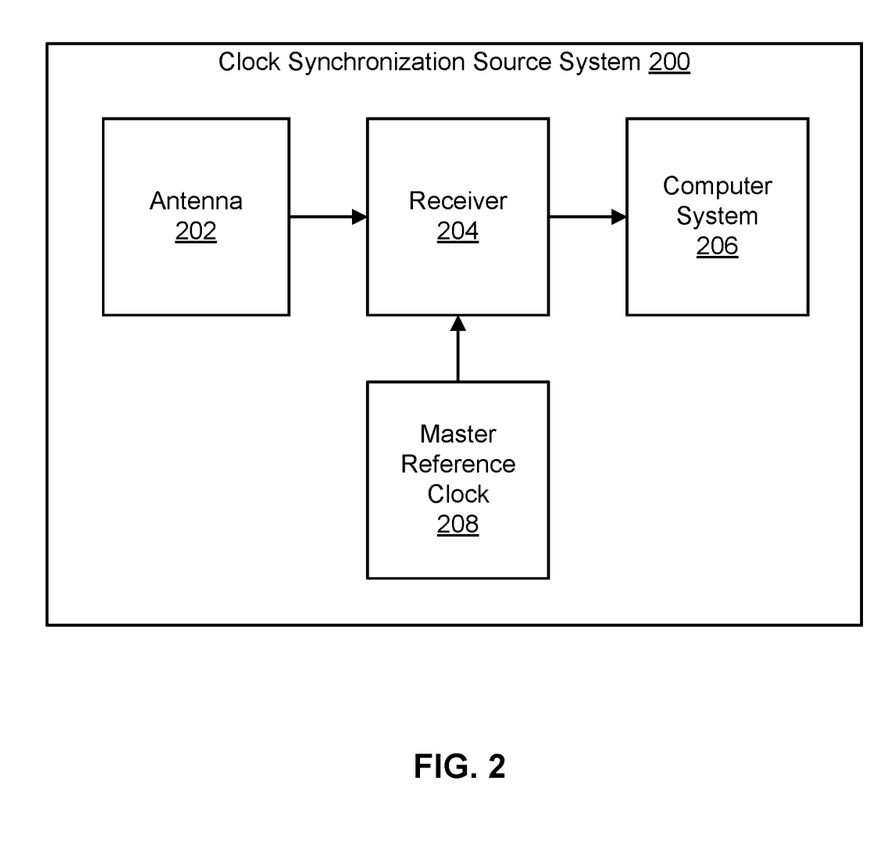
FIG. 2 is a block diagram illustrating an embodiment of a clock synchronization source system.

FIG. 2 is a block diagram illustrating an embodiment of a clock synchronization source system. In some embodiments, clock synchronization source system 200 is a part of reference terrestrial site 102 of FIG. 1. In the example shown, clock synchronization source system 200 includes antenna 202, receiver 204, computer system 206, and master reference clock 208.

In various embodiments, antenna 202 receives satellite signals (e.g., from satellite system 108 of FIG. 1). Antenna 202 intercepts radio waves propagating through space in order to produce an electric current at its terminals. In some embodiments, antenna 202 includes a low noise amplifier that increases the strength of received signals. Examples of antenna types include patch and quad helix antennas. Antenna 202 is tuned to frequencies transmitted by satellites it is listening to (e.g., satellites of satellite system 108 of FIG. 1).

Receiver 204 processes signals received by antenna 202. In various embodiments, receiver 204 estimates its current position on Earth (e.g., reporting latitude, longitude, and elevation coordinates) and a time offset between an internal receiver clock and GNSS time (e.g., atomic clock time of satellites of satellite system 108 of FIG. 1). In some embodiments, the time offset is utilized to synchronize receiver 204's internal clock with the atomic clocks of a GNSS. In some embodiments, processing to estimate receiver 204's position on Earth and the time offset is performed by electronic circuits and/or software of receiver 204. For example, an application-specific integrated circuit (ASIC) of receiver 204 may be configured to perform the position and time calculations. In various embodiments, receiver 204 includes a PPS generator configured to output a periodic waveform (e.g., a square wave) aligned with GNSS time. For example, the PPS generator can be configured to output a square wave at the exact start of each second of time kept by atomic clocks of a GNSS. The PPS generator can be driven by a reference oscillator of receiver 204 (e.g., a quartz oscillator) or a reference oscillator connected to receiver 204. A signal with a period of one second (or with another period) can be generated from the reference oscillator using electronic divider circuits. In some embodiments, time that is calculated by receiver 204 to correspond to GNSS time is utilized to adjust the reference oscillator frequency and/or phase to cause a waveform (e.g., a square wave) associated with the reference oscillator to align with the start of each second of time kept by the GNSS.

In the example illustrated, master reference clock 208 connects to receiver 204. Master reference clock 208 is a significantly more precise clock/oscillator that what receiver 204 possesses. In some embodiments, master reference clock 208 is an OCXO or an atomic clock, such as a cesium or rubidium clock. In some embodiments, master reference clock 208 is the reference oscillator that drives the PPS generator of receiver 204. Utilizing a more precise clock connected to receiver 204 instead of a less precise one within receiver 204 results in a more accurate and stable PPS signal. In some embodiments, a feedback tracking loop (e.g., employing phase adjustments) locks the output of master reference clock 208 to GNSS signals received by receiver 204 to increase stability and accuracy of the PPS signal. GNSS signals have superior long-term stability and OCXOs and atomic clocks have superior short-term stability. Thus, utilizing both timing sources combines long-term stability and short-term stability to provide superior overall stability. In various embodiments, when GNSS signals become unavailable, the reference oscillator enters a holdover state in which it attempts to maintain accurate timing using only its internal oscillator. In a holdover scenario, in various embodiments, master reference clock 208 is the master reference clock for clock synchronization source system 200. It is also possible for a clock of a GNSS (also a precision clock, such as an atomic clock) to be the master reference clock for clock synchronization source system 200 (e.g., if master reference clock 208 is not used). In some embodiments, master reference clock 208 is synchronized with a clock of the GNSS, in which case both master reference clock 208 and the clock of the GNSS can be master reference clocks for clock synchronization source system 200.

In the example illustrated, computer system 206 is connected to receiver 204. Computer system 206 can be a programmed computer system. In various embodiments, computer system 206 receives a PPS signal outputted by receiver 204. In various embodiments, computer system 206 timestamps the PPS signal. For example, a PHC in computer system 206 can provide the timestamps. In various embodiments, computer system 206 includes a network interface that is utilized to send and receive messages over a network (e.g., network 106 of FIG. 1). In various embodiments, computer system 206 receives, via a network, a timestamp from a remote clock synchronization destination (e.g., remote clock synchronization destination system 300 of FIG. 3), compares it to a locally produced timestamp, calculates a clock adjustment value based on the difference between the two timestamps, and transmits the calculated clock adjustment value back, via the network, to the remote clock synchronization destination. The clock adjustment value is able to be utilized by the remote clock synchronization destination to synchronize its time with that of clock synchronization source system 200. It is also possible to send the locally produced timestamp and calculate the clock adjustment value at the remote clock synchronization destination. In some embodiments, a servo mechanism is utilized by the remote clock synchronization destination to minimize spontaneous and short-term errors associated with synchronizing the remote clock synchronization destination with clock synchronization source system 200.

Figure 3:
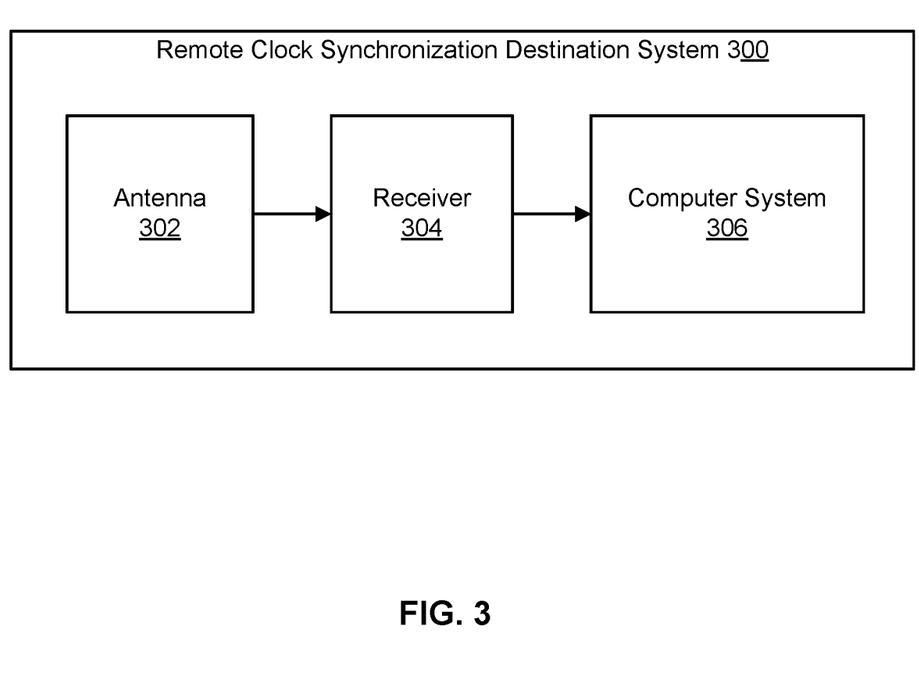
FIG. 3 is a block diagram illustrating an embodiment of a remote clock synchronization destination system.

FIG. 3 is a block diagram illustrating an embodiment of a remote clock synchronization destination system. In some embodiments, remote clock synchronization destination system 300 is a part of remote terrestrial site 104 of FIG. 1. In the example shown, remote clock synchronization destination system 300 includes antenna 302, receiver 304, and computer system 306.

In various embodiments, antenna 302 receives satellite signals (e.g., from satellite system 108 of FIG. 1). Antenna 302 intercepts radio waves propagating through space in order to produce an electric current at its terminals. In some embodiments, antenna 302 includes a low noise amplifier that increases the strength of received signals. Examples of antenna types include patch and quad helix antennas. Antenna 302 is tuned to frequencies transmitted by satellites it is listening to (e.g., satellites of satellite system 108 of FIG. 1).

Receiver 304 processes signals received by antenna 302. In various embodiments, receiver 304 estimates its current position on Earth (e.g., reporting latitude, longitude, and elevation coordinates) and a time offset between an internal receiver clock and GNSS time (e.g., atomic clock time of satellites of satellite system 108 of FIG. 1). Under normal operating conditions (e.g., in the absence of a satellite outage), the time offset is utilized to synchronize receiver 304's internal clock with the atomic clocks of a GNSS. In some embodiments, processing to estimate receiver 304's position on Earth and the time offset is performed by electronic circuits and/or software of receiver 304. For example, an ASIC of receiver 304 may be configured to perform the position and time calculations. In various embodiments, receiver 304 includes a PPS generator configured to output a periodic waveform (e.g., a square wave) aligned with GNSS time. For example, the PPS generator can be configured to output a square wave at the calculated start of each second of time kept by atomic clocks of a GNSS. The PPS generator can be driven by a reference oscillator (e.g., a quartz oscillator). A signal with a period of one second (or another period) can be generated from the reference oscillator using electronic divider circuits. In some embodiments, time that is calculated by receiver 304 to correspond to GNSS time is utilized to adjust the reference oscillator frequency and/or phase to cause a waveform (e.g., a square wave) associated with the reference oscillator to align with the start of each second of time kept by the GNSS. In some embodiments, when GNSS signals become unavailable, the reference oscillator enters a holdover state in which it attempts to maintain accurate timing using only its internal oscillator. Because of instability of the reference oscillator, drift and inaccuracy of the periodic waveform (the PPS signal) can result, particularly in the holdover state. During a satellite outage, the likelihood of the PPS signal not being aligned with the start of each second of time kept by the GNSS is increased.

In the example illustrated, computer system 306 is connected to receiver 304. Computer system 306 can be a programmed computer system. In various embodiments, computer system 306 receives a PPS signal outputted by receiver 304. In various embodiments, computer system 306 timestamps the PPS signal. For example, a PHC in computer system 306 can provide the timestamps. In various embodiments, computer system 306 includes a network interface that is utilized to send and receive messages over a network (e.g., network 106 of FIG. 1). In various embodiments, computer system 306 sends, via a network, a timestamp to a clock synchronization source (e.g., clock synchronization source system 200 of FIG. 2) and receives from the clock synchronization source, via the network, a clock adjustment value that is able to be utilized to correct timing errors in the PPS signal and time synchronize with the clock synchronization source. In some embodiments, a servo mechanism is utilized to minimize spontaneous and short-term errors associated with synchronizing with the clock synchronization source.

Figure 4:
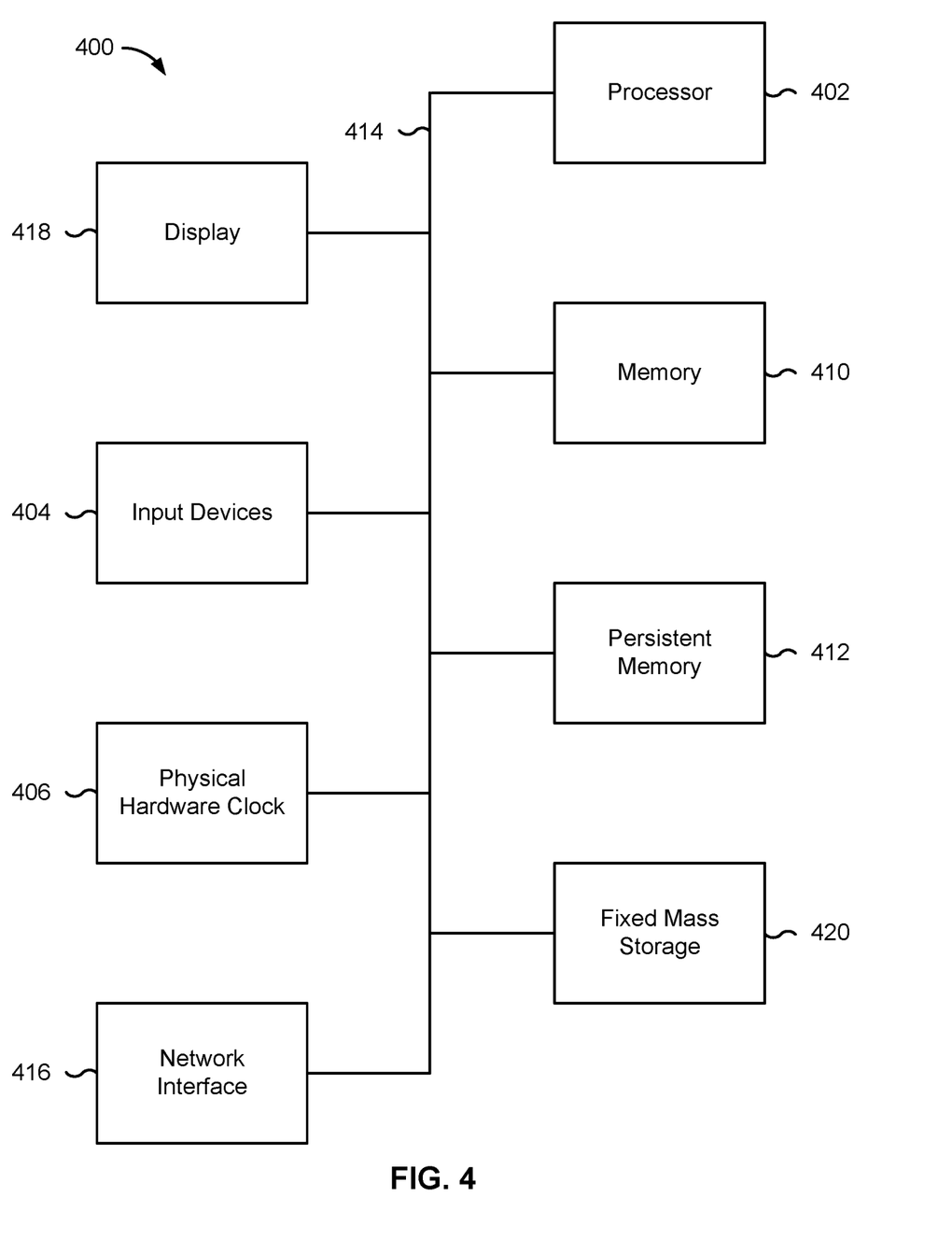
FIG. 4 is a functional diagram illustrating a programmed computer system.

FIG. 4 is a functional diagram illustrating a programmed computer system. In some embodiments, the programmed computer system is computer system 206 of FIG. 2 and/or computer system 306 of FIG. 3.

In the example shown, computer system 400 includes various subsystems as described below. Computer system 400 includes at least one microprocessor subsystem (also referred to as a processor or a central processing unit (CPU)) 402. For example, processor 402 can be implemented by a single-chip processor or by multiple processors. In some embodiments, processor 402 is a general-purpose digital processor that controls the operation of computer system 400. Using instructions retrieved from memory 410, processor 402 controls the reception and manipulation of input data, and the output and display of data on output devices (e.g., display 418).

Processor 402 is coupled bi-directionally with memory 410, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 402. Also, as is well known in the art, primary storage typically includes basic operating instructions, program code, data, and objects used by the processor 402 to perform its functions (e.g., programmed instructions). For example, memory 410 can include any suitable computer-readable storage media, described below, depending on whether, for example, data access needs to be bi-directional or uni-directional. For example, processor 402 can also directly and very rapidly retrieve and store frequently needed data in a cache memory (not shown).

Persistent memory 412 (e.g., a removable mass storage device) provides additional data storage capacity for computer system 400, and is coupled either bi-directionally (read/write) or uni-directionally (read only) to processor 402. For example, persistent memory 412 can also include computer-readable media such as magnetic tape, flash memory, PC-CARDS, portable mass storage devices, holographic storage devices, and other storage devices. A fixed mass storage 420 can also, for example, provide additional data storage capacity. The most common example of fixed mass storage 420 is a hard disk drive. Persistent memory 412 and fixed mass storage 420 generally store additional programming instructions, data, and the like that typically are not in active use by the processor 402. It will be appreciated that the information retained within persistent memory 412 and fixed mass storages 420 can be incorporated, if needed, in standard fashion as part of memory 410 (e.g., RAM) as virtual memory.

In addition to providing processor 402 access to storage subsystems, bus 414 can also be used to provide access to other subsystems and devices. As shown, these can include a display monitor 418, a network interface 416, input devices 404, such as a keyboard and a pointing device (e.g., a mouse, stylus, track ball, or tablet), and physical hardware clock 406, as well as an auxiliary input/output device interface, a sound card, speakers, and other subsystems as needed. Physical hardware clock 406 keeps time and generates internal hardware clock values corresponding to the time kept. Physical hardware clock 406 can be an integrated circuit clock, such as a silicon-based or quartz crystal-based oscillator. Physical hardware clock 406 can produce hardware timestamps corresponding to the time it keeps.

Network interface 416 allows processor 402 to be coupled to another computer, computer network, or telecommunications network using a network connection as shown. For example, through network interface 416, processor 402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 402 can be used to connect computer system 400 to an external network and transfer data according to standard protocols. Processes can be executed on processor 402, or can be performed across a network such as the Internet, intranet networks, or local area networks, in conjunction with a remote processor that shares a portion of the processing. Additional mass storage devices (not shown) can also be connected to processor 402 through network interface 416.

An auxiliary I/O device interface (not shown) can be used in conjunction with computer system 400. The auxiliary I/O device interface can include general and customized interfaces that allow processor 402 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 4 is but an example of a computer system suitable for use with the various embodiments disclosed herein. Other computer systems suitable for such use can include additional or fewer subsystems. In addition, bus 414 is illustrative of any interconnection scheme serving to link the subsystems. Other computer architectures having different configurations of subsystems can also be utilized.

Figure 5:
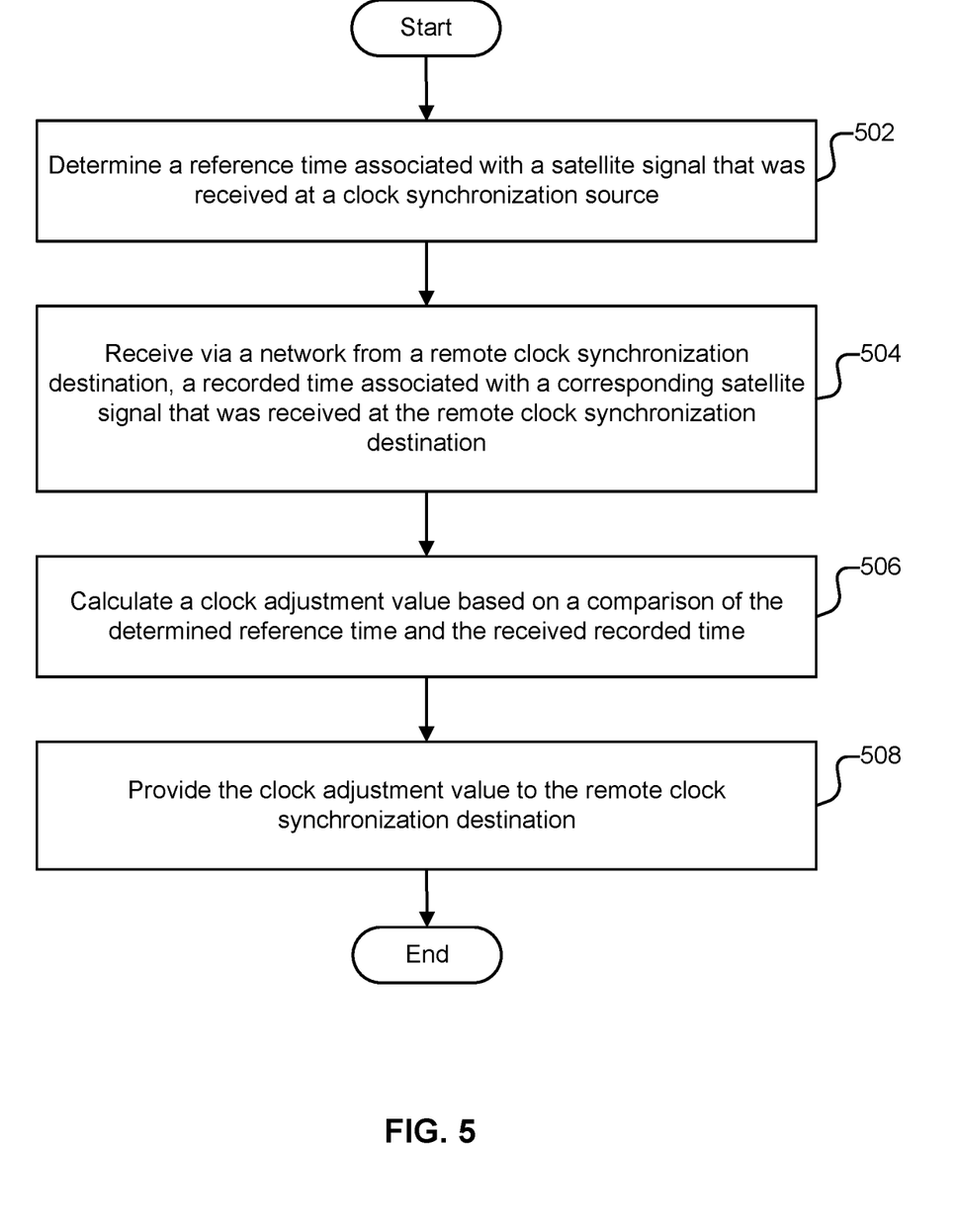
FIG. 5 is a flow chart illustrating an embodiment of a process for synchronizing a remote clock synchronization destination.

FIG. 5 is a flow chart illustrating an embodiment of a process for synchronizing a remote clock synchronization destination. In some embodiments, the process of FIG. 5 is performed by clock synchronization source system 200 of FIG. 2. In some embodiments, the process of FIG. 5 is performed by computer system 206 of FIG. 2.

At 502, a reference time associated with a satellite signal that was received at a clock synchronization source is determined. In various embodiments, the reference time is from a master reference clock. In some embodiments, the clock synchronization source is reference terrestrial site 102 of FIG. 1. In various embodiments, the satellite signal is received from one or more satellites in a GNSS. In some embodiments, the GNSS is satellite system 108 of FIG. 1. In various embodiments, the clock synchronization source is a system that includes an antenna and receiver (e.g., a GNSS receiver, such as a GPS receiver). In some embodiments, the reference time associated with the satellite signal corresponds to when the satellite signal was received at the clock synchronization source. The reference time can be determined by generating a timestamp that is triggered by a receiver in response to receiving the satellite signal. In some embodiments, the satellite signal includes satellite position and time information. In various embodiments, a receiver of the clock synchronization source is able to determine a geolocation of the receiver as well as a time kept by the GNSS by processing the satellite signal. In some embodiments, the clock synchronization source includes a precision clock (e.g., an atomic clock) that is utilized as the master reference clock. The precision clock may also be synchronized with clocks of the GNSS. The precision clock's time values may be uploaded to the GNSS to help maintain accuracy of the clocks of the GNSS. In various embodiments, a PPS signal generated by a receiver (e.g., GPS receiver) of the clock synchronization source is timestamped to generate the reference time. For example, the start of each second of the master reference clock can be aligned with a specified portion of a periodic PPS signal (e.g., start of a flat portion of a square wave) and timestamped. In some embodiments, a PHC of a computer system (e.g., computer system 206 of FIG. 2) provides the timestamp.

At 504, a recorded time associated with a corresponding satellite signal that was received at a remote clock synchronization destination is received from the remote clock synchronization destination via a network. In various embodiments, the received recorded time is from a remote clock to be synchronized with the master reference clock. In some embodiments, the remote clock synchronization destination is remote terrestrial site 104 of FIG. 1. In some embodiments, the network is network 106 of FIG. 1. In some embodiments, the recorded time is received by computer system 206 of FIG. 2. In various embodiments, the corresponding satellite signal is received at the remote clock synchronization destination at approximately the same time as the satellite signal in 502 is received at the clock synchronization source. Under normal operating conditions (e.g., in the absence of any satellite outage), in various embodiments, the satellites signals received at the clock synchronization source and the remote clock synchronization destination result in respective PPS signals that are aligned. The aligned PPS signals can be utilized to synchronize time between the clock synchronization source and the remote clock synchronization destination. Stated alternatively, in the absence of satellite signal disruptions, the satellite signals can be used for time synchronization. In some embodiments, the recorded time is a timestamp produced by a PHC. In various embodiments, the PHC or another clock synchronized to the PHC is the remote clock at the remote clock synchronization destination is to be synchronized with the master reference clock at the clock synchronization source. In various embodiments, the recorded time aligns with (e.g., is equal to or is substantially the same value as) the reference time at the clock synchronization source under normal operating conditions (e.g., in the absence of satellite signal broadcast disruption) but drifts and/or is otherwise inaccurate during satellite outage events (e.g., jamming, spoofing, interference, etc. at the remote clock synchronization destination).

At 506, a clock adjustment value is calculated based on a comparison of the determined reference time and the received recorded time. In some embodiments, the clock adjustment value is calculated by computer system 206 of FIG. 2. In some embodiments, calculating the clock adjustment value includes subtracting the received recorded time from the determined reference time or vice versa. Stated alternatively, in various embodiments, an error term between the determined reference time and the received recorded time is determined.

At 508, the clock adjustment value is provided to the remote clock synchronization destination. The clock adjustment value is able to be utilized by the remote clock synchronization destination to adjust the remote clock to increase synchronization with the master reference clock. In various embodiments, the clock adjustment value is transmitted to the remote clock synchronization destination via the network (e.g., network 106 of FIG. 1). In some embodiments, the remote clock synchronization destination has a local network that utilizes the remote clock as a master local clock device to synchronize other clocks in the local network (e.g., see FIG. 6). In some embodiments, the remote clock synchronization destination incorporates the clock adjustment value in a servo mechanism to synchronize the remote clock with the master reference clock (e.g., see FIG. 7).

Figure 6:
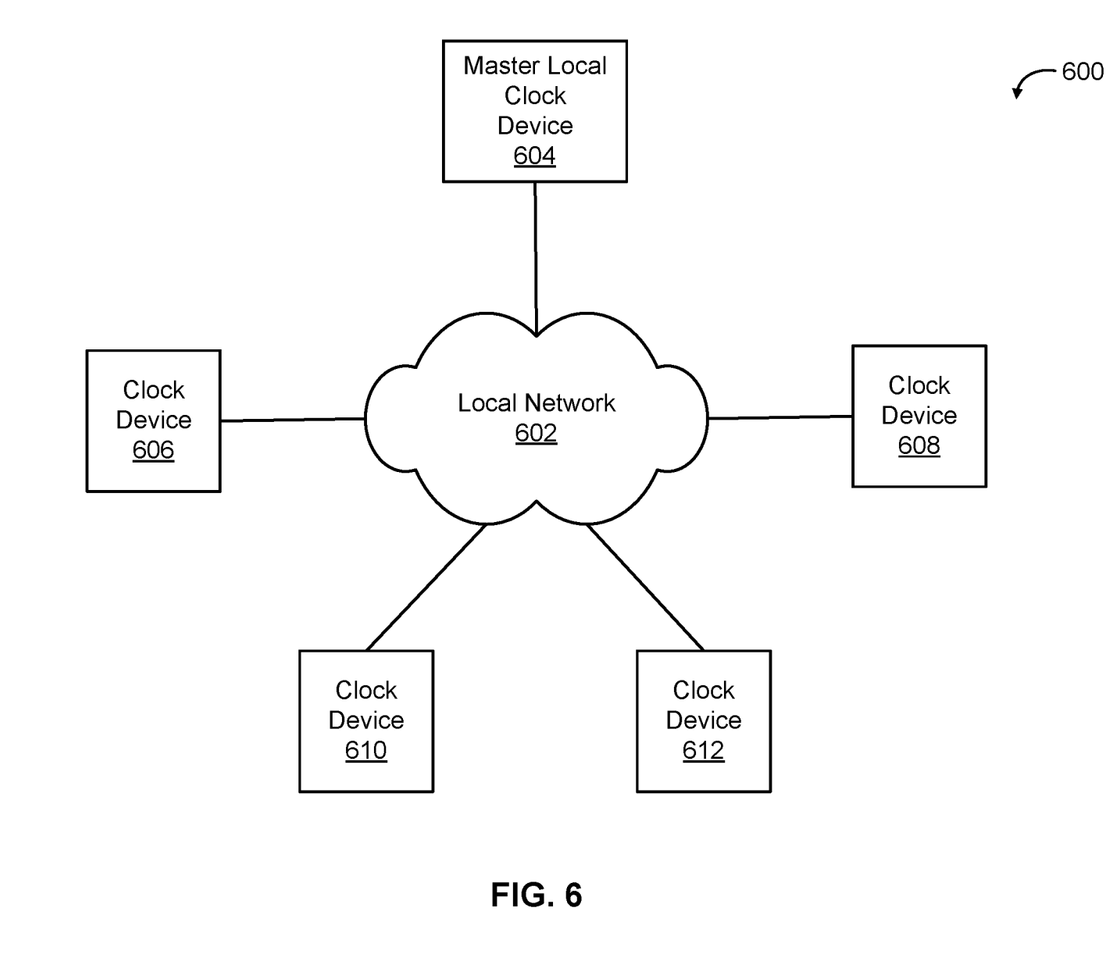
FIG. 6 is a diagram illustrating an embodiment of clock devices connected via a local network.

FIG. 6 is a diagram illustrating an embodiment of clock devices connected via a local network. In system 600, master local clock device 604 and clock devices 606, 608, 610, and 612 are communicatively connected to one another through local network 602. The number of clock devices shown is merely illustrative. It is possible for there to be fewer or more clock devices in system 600. In some embodiments, local network 602 is a local area network (LAN). Other examples of local network 602 include one or more of the following: a direct or indirect physical communication connection, mobile communication network, Internet, intranet, Wide Area Network, Storage Area Network, and any other form of connecting two or more systems, components, or storage devices together. In some embodiments, the clock devices are network interface controllers (NICs). For example, PHCs located on NICs can be utilized to keep time. In various embodiments, the NICs are parts of computers connected to local network 602. In various embodiments, each PHC generates internal hardware clock values corresponding to the time kept by the PHC. In various embodiments, the PHC is an integrated circuit clock, such as a silicon-based or quartz crystal-based oscillator. Hardware clock oscillators (e.g., silicon-based or quartz crystal-based) oftentimes degrade as a function of time (e.g., due to temperature effects, mechanical damage, radiation damage, damage to packaging/connector materials, natural aging, and other effects). In some embodiments, PHCs utilize 80-bit counters (80 binary digits), of which 48 bits measure sub-second time.

In various embodiments, the clocks in system 600 exhibit timing errors that are remedied with a network synchronization protocol such as NTP, PTP, or another protocol. In the example illustrated, master local clock device 604 serves as a master clock against which other clocks are synchronized.

In some embodiments, master local clock device 604 is a clock of remote terrestrial site 104 of FIG. 1 that is synchronized with a master reference clock of reference terrestrial site 102 of FIG. 1. In some embodiments, master local clock device 604 is a clock of remote clock synchronization destination system 300 of FIG. 3 that is synchronized with a master reference clock of clock synchronization source system 200 of FIG. 2. The master clock may be referred to as a grandmaster, time provider, or another similar term. The grandmaster is oftentimes a clock that is of higher quality and is more accurate than the other clocks, such as an atomic clock. The grandmaster may be selected based on a master clock selection algorithm (e.g., best master clock algorithm). Clocks other than the grandmaster can be ordinary clocks (non-grandmaster clocks with a single network connection, also referred to as slaves), boundary clocks (clocks with multiple network connections that can synchronize one network segment to another), or transparent clocks (clocks that modify messages passing through and can measure and adjust for network delays).

The clock devices in system 600 may be communicatively connected in a variety of different topologies. The types of clock devices in system 600 may also vary. Timing errors can vary depending on the specific topology and types of devices. The performance of a network synchronization protocol (e.g., how long synchronization takes to complete) can also vary depending on the specific topology and types of devices.

Figure 7:
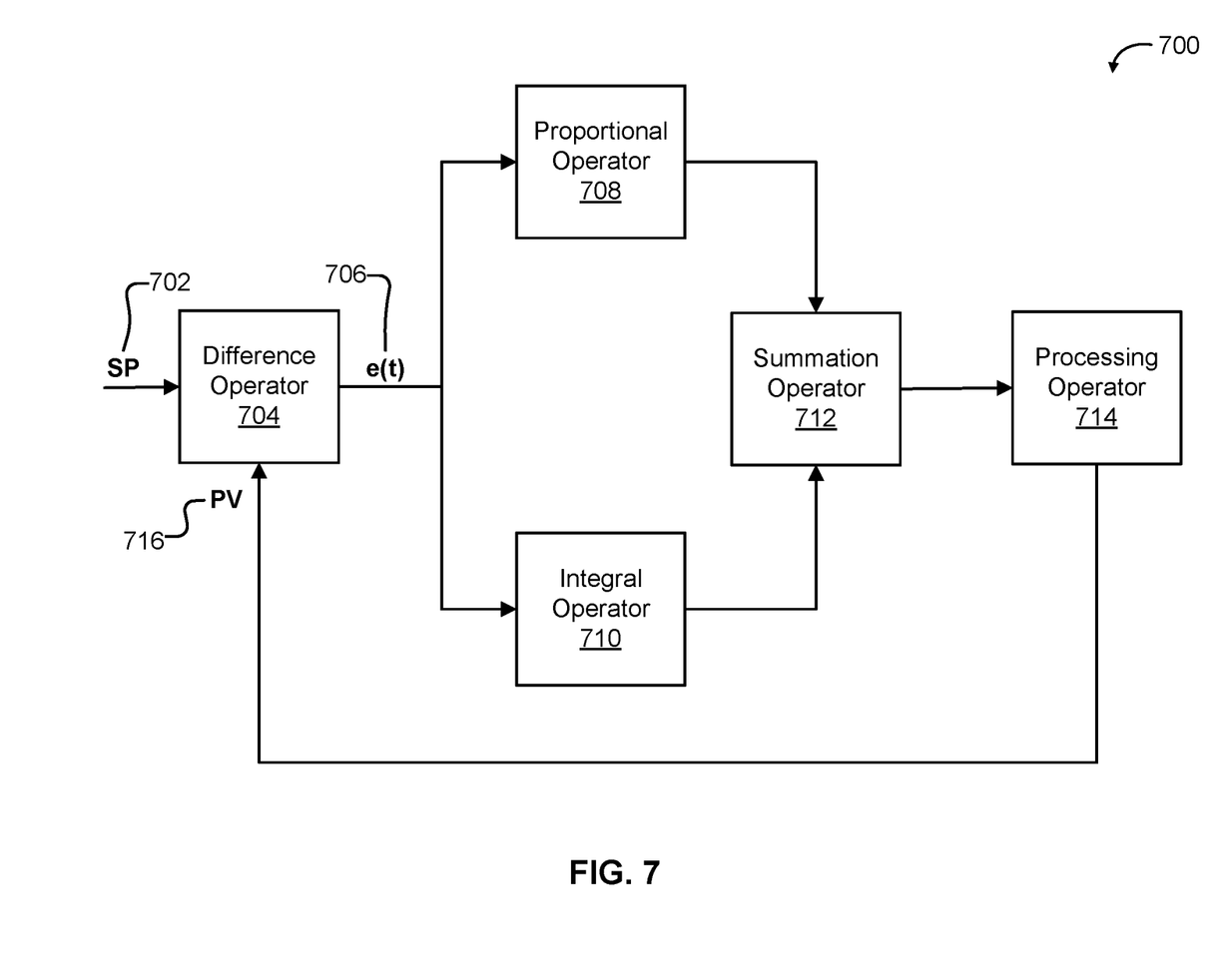
FIG. 7 is a diagram illustrating an example servo mechanism for correcting timing errors.

FIG. 7 is a diagram illustrating an example servo mechanism for correcting timing errors. In some embodiments, servo mechanism 700 is utilized to correct timing errors of a clock of remote terrestrial site 104 of FIG. 1 and/or remote clock synchronization destination system 300 of FIG. 3. In some embodiments, servo mechanism 700 is performed in software. For example, servo mechanism 700 may be implemented as computer code running on computer system 306 of FIG. 3.

In the example illustrated, servo mechanism 700 operates on SP (setpoint) 702 and PV (process variable) 716. In various embodiments, SP 702 corresponds to a timing synchronization source time that is regarded as a correct time (e.g., a master reference clock of reference terrestrial site 102 of FIG. 1 and/or clock synchronization source system 200 of FIG. 2). In some embodiments, SP 702 is calculated based on various timestamps associated with network messages. In various embodiments, SP 702 is determined based at least in part on one or more messages from the timing synchronization source received via a network (e.g., network 106 of FIG. 1). In various embodiments, PV 716 corresponds to a clock time that needs to be corrected. In the example illustrated, difference operator 704 takes SP 702 and PV 716 as inputs, determines the difference between the inputs, and outputs the difference as e(t) 706. It is also possible for e(t) 706 to be directly provided to servo mechanism 700. For example, a clock adjustment value that is a difference between a reference clock and a clock to be corrected may be received. In the example shown, the difference between SP 702 and PV 716 is referred to as an error e(t) (e.g., e(t)=PV−SP).

In the example illustrated, e(t) 706 is received by proportional operator 708 and integral operator 710. In various embodiments, proportional operator 708 multiples e(t) 706 by a gain factor $K_P$. For example, the output of proportional operator 708 can be written as $P=K_P*e(t)$. In various embodiments, integral operator 710 accounts for past values of e(t) and integrates them over time. For example, the output of integral operator 710 can be written as $I=K_I\int e(\tau)d\tau$. $K_I$ is a gain factor. Integral operator 710 adds a control effect based on the historic cumulative value of the error e(t). The relative effects of proportional operator 708 and integral operator 710 are controlled by the gain factors $K_P$ and $K_I$, respectively. In the example illustrated, summation operator 712 sums P and I. This sum is acted upon by processing operator 714. Processing operator 714 performs an action that alters the value of PV 716. For example, with respect to PV 716 being a clock time, in some embodiments, processing operator 714 transmits a command to clock hardware that slows down or speeds up a PHC associated with PV 716. The PHC can be slowed down or sped up by decreasing or increasing an oscillation frequency, respectively, of an oscillator of the PHC. In order to decrease the error e(t) 706, the PHC would be slowed down if PV 716 is greater than SP 702 and sped up if PV 716 is less than SP 702. It is also possible to directly set the PHC to a specific clock value or step the PHC to change its clock value.

The example illustrated is an example of a proportional integral control loop. It is also possible for servo mechanism 700 to include a derivative operator (e.g., a derivative of e(t) multiplied by a gain factor) whose output is also included as an input to summation operator 712, in which case servo mechanism 700 would be an example of a proportional integral derivative control loop. Servo mechanism 700 is an example of a feedback control loop because the output of the processing steps is fed back as an input. Stated alternatively, PV 716 is both an output and an input of servo mechanism 700. Servo mechanism 700 acts to reduce e(t) over successive iterations of processing until e(t) converges to zero or some other specified value. Stated alternatively, servo mechanism 700 acts on PV 716 until it converges (equals) SP 702 or is within a specified range of SP 702. In various embodiments, PV 716 is transmitted across a network (e.g., network 106 of FIG. 1) to a timing synchronization source (e.g., reference terrestrial site 102 of FIG. 1 and/or clock synchronization source system 200 of FIG. 2), which returns, via the network, an SP 702 and/or e(t) 706. Updated values of PV 716 being transmitted result in updated values of SP 702 and/or e(t) 706 being received, resulting in a feedback control mechanism to reduce e(t) 706.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining at a clock synchronization source a reference time associated with a satellite signal received at a clock synchronization source, wherein the reference time is from a master reference clock;
   receiving at the clock synchronization source via a network from a remote clock synchronization destination, a recorded time associated with a corresponding satellite signal received at the remote clock synchronization destination, wherein the received recorded time is from a remote clock to be synchronized with the master reference clock;
   calculating at the clock synchronization source a clock adjustment value based on a comparison of the determined reference time and the received recorded time; and
   providing the clock adjustment value from the clock synchronization source to the remote clock synchronization destination, wherein the clock adjustment value is able to be utilized by the remote clock synchronization destination to adjust the remote clock to increase synchronization with the master reference clock, wherein the clock adjustment value is utilized by the remote clock synchronization destination to calculate a first value proportional to the clock adjustment value, calculate a second value proportional to an integration of past clock adjustment values, calculate a sum of the first value and the second value, and adjust a property of the remote clock based at least in part on the calculated sum.

2. The method of claim 1, wherein the satellite signal is received from a Global Navigation Satellite System (GNSS).

3. The method of claim 1, wherein the master reference clock includes an oven-controlled crystal oscillator (OCXO) or an atomic clock.

4. The method of claim 1, wherein the master reference clock includes an oscillator for a pulse-per-second (PPS) generator that generates a periodic waveform having a specified alignment with time kept by the master reference clock.

5. The method of claim 1, wherein determining the reference time includes obtaining a hardware timestamp during an occurrence of a specified portion of a pulse-per-second signal generated at the clock synchronization source.

6. The method of claim 1, wherein the clock synchronization source includes an antenna and a receiver that is connected to the antenna and configured to calculate a synchronized time kept by a Global Navigation Satellite System.

7. The method of claim 1, wherein the network includes a wide area network (WAN).

8. The method of claim 1, wherein the recorded time is associated with a hardware timestamp of the remote clock obtained during a period of unreliable communication between the remote clock synchronization destination and a Global Navigation Satellite System.

9. The method of claim 8, wherein the period of unreliable communication is caused at least in part by deliberate use of radio transmissions to prevent listening to the Global Navigation Satellite System.

10. The method of claim 8, wherein the period of unreliable communication is caused at least in part by reception at the remote clock synchronization destination of incorrect geolocation and/or time signals intended to be mistaken for actual signals from the Global Navigation Satellite System.

11. The method of claim 8, wherein the period of unreliable communication is caused at least in part by electronic noise, emitted by electronic devices operating in a same vicinity as the remote clock synchronization destination, intended to interfere with reception of signals from the Global Navigation Satellite System.

12. The method of claim 1, wherein the remote clock synchronization destination is a moving object.

13. The method of claim 1, wherein calculating the clock adjustment value includes subtracting the determined reference time from the received recorded time or vice versa.

14. The method of claim 1, wherein providing the clock adjustment value to the remote clock synchronization destination includes transmitting the clock adjustment value via the network.

15. The method of claim 1, wherein the remote clock is able to be utilized to synchronize one or more clock devices communicatively connected to the remote clock through a local network at the remote clock synchronization destination.

16. The method of claim 1, wherein the remote clock is able to be utilized to synchronize one or more other clock devices using precision time protocol (PTP).

17. The method of claim 1, wherein the remote clock synchronization destination utilizes a feedback control mechanism to adjust the remote clock to increase synchronization with the master reference clock.

18. A clock synchronization source system, comprising:
one or more processors configured to:
determine a reference time associated with a satellite signal received at a clock synchronization source, wherein the reference time is from a master reference clock;
receive via a network from a remote clock synchronization destination, a recorded time associated with a corresponding satellite signal received at the remote clock synchronization destination, wherein the received recorded time is from a remote clock to be synchronized with the master reference clock;
calculate a clock adjustment value based on a comparison of the determined reference time and the received recorded time; and
provide the clock adjustment value to the remote clock synchronization destination, wherein the clock adjustment value is able to be utilized by the remote clock synchronization destination to adjust the remote clock to increase synchronization with the master reference clock, wherein the clock adjustment value is utilized by the remote clock synchronization destination to calculate a first value proportional to the clock adjustment value, calculate a second value proportional to an integration of past clock adjustment values, calculate a sum of the first value and the second value, and adjust a property of the remote clock based at least in part on the calculated sum; and
a memory coupled to at least one of the one or more processors and configured to provide at least one of the one or more processors with instructions.

19. The system of claim 18, wherein the master reference clock includes an oscillator for a pulse-per-second (PPS) generator that generates a periodic waveform having a specified alignment with time kept by the master reference clock.

20. A computer program product embodied in a non-transitory computer readable medium and comprising computer instructions for:
determining at a clock synchronization source a reference time associated with a satellite signal received at a clock synchronization source, wherein the reference time is from a master reference clock;
receiving at the clock synchronization source via a network from a remote clock synchronization destination, a recorded time associated with a corresponding satellite signal received at the remote clock synchronization destination, wherein the received recorded time is from a remote clock to be synchronized with the master reference clock;
calculating at the clock synchronization source a clock adjustment value based on a comparison of the determined reference time and the received recorded time; and
providing the clock adjustment value from the clock synchronization source to the remote clock synchronization destination, wherein the clock adjustment value is able to be utilized by the remote clock synchronization destination to adjust the remote clock to increase synchronization with the master reference clock, wherein the clock adjustment value is utilized by the remote clock synchronization destination to calculate a first value proportional to the clock adjustment value, calculate a second value proportional to an integration of past clock adjustment values, calculate a sum of the first value and the second value, and adjust a property of the remote clock based at least in part on the calculated sum.

* * * * *